United States Patent [19]

Minalga

[11] 4,217,531
[45] Aug. 12, 1980

[54] DIGITALLY CONTROLLED GAIN REDUCTION IN A POSITIONING SYSTEM

[75] Inventor: Philip F. Minalga, Piscataway, N.J.

[73] Assignee: The Singer Company, Stamford, Conn.

[21] Appl. No.: 928,937

[22] Filed: Jul. 28, 1978

[51] Int. Cl.² .............................................. G05F 1/00
[52] U.S. Cl. .................................... 318/677; 318/681; 330/86
[58] Field of Search .............. 318/677, 678, 679, 681, 318/571; 332/9; 330/86; 307/229

[56] References Cited

U.S. PATENT DOCUMENTS

| | | | |
|---|---|---|---|
| 3,106,684 | 7/1960 | Luik | 328/142 |
| 3,153,152 | 10/1964 | Hoffman | 307/229 |
| 3,209,266 | 9/1965 | White | 328/132 |
| 3,243,717 | 3/1966 | Aviv et al. | 330/10 |
| 3,373,959 | 10/1968 | Peterson | 330/86 |
| 3,497,830 | 3/1968 | Colton | 332/9 |
| 3,679,986 | 7/1972 | Zaman | 330/86 |
| 3,714,602 | 1/1973 | Macy | 330/86 |
| 3,794,931 | 2/1974 | Albrecht | 330/29 |
| 4,009,447 | 2/1977 | Wolf | 330/110 |
| 4,016,821 | 4/1977 | Minalga | 318/571 X |
| 4,066,976 | 1/1978 | Dickopp | 330/86 |
| 4,070,632 | 1/1978 | Tuttle | 330/86 |

*Primary Examiner*—Benjamin Dobeck
*Attorney, Agent, or Firm*—David L. Davis; Robert E. Smith; Edward L. Bell

[57] ABSTRACT

A system is disclosed for positioning an instrumentality over a predetermined range in response to a digitally coded position signal. To effect a controlled reduction in the instrumentality movement, an operational amplifier is provided having a feedback circuit including a fixed resistor and a controllable switch connected across the resistor. The switch is selectively controlled to short circuit the resistor at a controlled rate to effect a controlled gain reduction for the operational amplifier.

6 Claims, 1 Drawing Figure

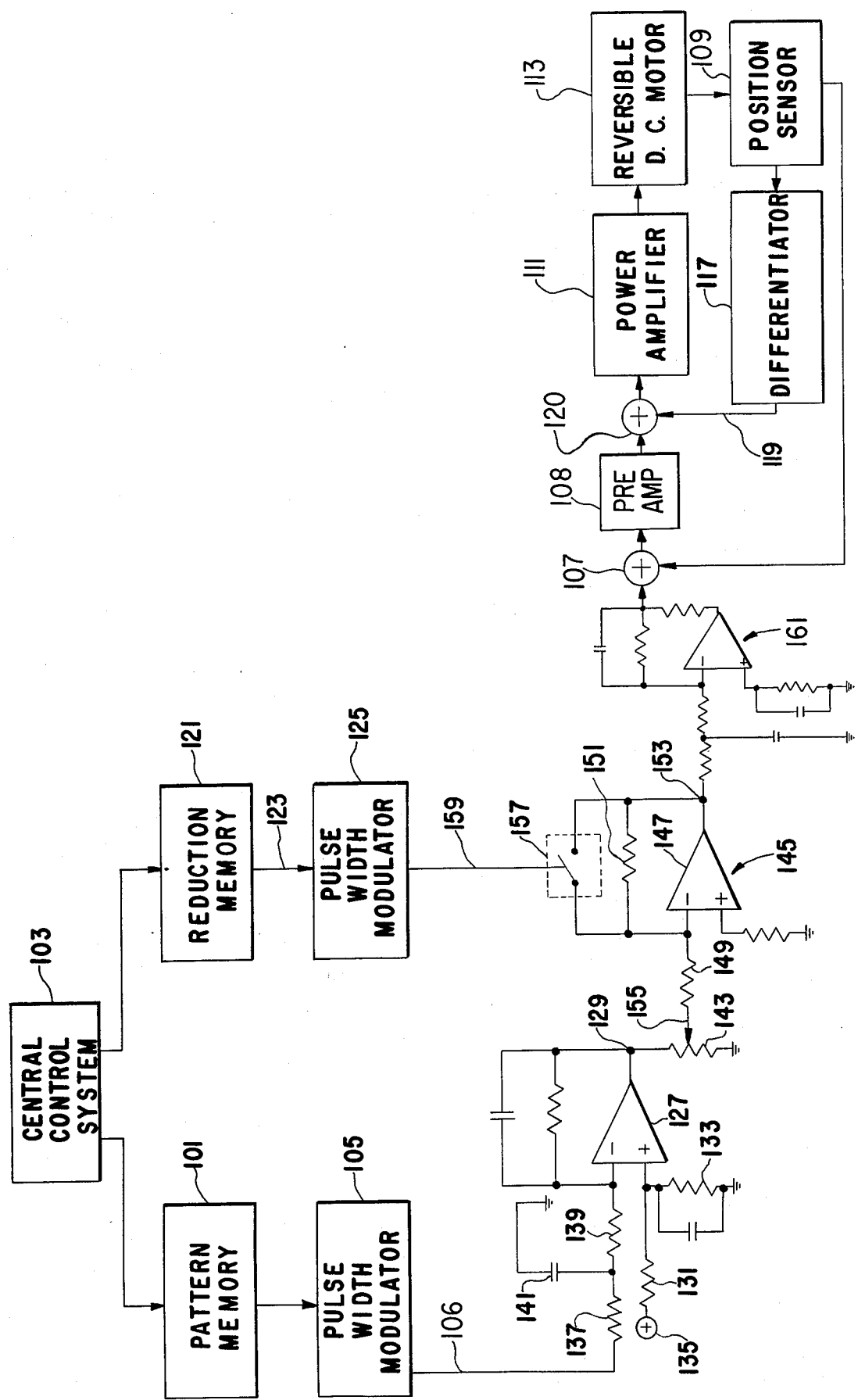

DIGITALLY CONTROLLED GAIN REDUCTION IN A POSITIONING SYSTEM

BACKGROUND OF THE INVENTION

This invention relates to amplifier gain control and, more particularly, to digitally controlled amplifier gain reduction.

A system is disclosed in U.S. Pat. No. 4,016,821, issued on Apr. 12, 1977, to the applicant herein, wherein logic is used to select and release stitch information stored in a memory in timed relation with the operation of a sewing machine. Digital information from the memory is converted to positional analog signals which control closed loop servo systems including moving coil linear actuators directly controlling the position of conventional stitch forming instrumentalities of the sewing machine to reproduce a pattern of stitches corresponding to the selected stitch information. According to the system disclosed in the referenced patent, circuitry is provided which permits an operator to alter the stored bight and feed motions. Operator influenced means are effective to signal the logic circuitry to selectively apply a holding signal to an FET switch, maintaining the FET switch in the conductive state. Closing of this FET switch inserts the wiper of a potentionmeter in bypass arrangement in the feedback circuit of an operational amplifier interposed between a digital to analog converter for bight or feed and, respectively, the feed or bight servo system. By changing the magnitude of the resistance in the feedback circuit of the operational amplifier, the gain of the amplifier may be selectively reduced, thereby controlling the signal to the feed or bight linear actuator for selective reduction of stitch length or pattern width, respectively.

While the system described above, as disclosed in the aforereferenced U.S. patent, performs satisfactorily, the disclosed override control is an analog function added to a system which is otherwised digitally controlled. It is therefore an object of the present invention to provide digital override feed and bight controls for a stored pattern sewing machine.

SUMMARY OF THE INVENTION

The foregoing and additional objects are attained in accordance with the principles of this invention in a system for positioning an instrumentality over a predetermined range in response to a digitally coded position signal including digital to analog converter means for generating a positional analog signal related to the digitally coded position signal and closed loop servo means including a reversible electric motor responsive to the positional analog signal for positioning the instrumentality, by providing means for selectively reducing the movement of the instrumentality including an operational amplifier interposed between the digital to analog converter means and the closed loop servo means, the operational amplifier having a feedback circuit including a fixed resistor, controllable switch means connected across the resistor, and means for controlling the switch means to selectively short circuit the resistor at a controlled rate to effect a controlled gain reduction for the operational amplifier.

BRIEF DESCRIPTION OF THE DRAWING

The foregoing will be more readily apparent upon reading the following description in conjunction with the single figure of the drawing which illustrates circuitry constructed in accordance with the principles of this invention incorporated in a motor control system.

DETAILED DESCRIPTION

Referring now to the drawing, shown therein is a portion of a system for controlling the operation of a sewing machine, and in which circuitry constructed in accordance with the principles of this invention is incorporated. For a complete description of such a system, the reader is referred to copending U.S. patent application Ser. No. 928,940, filed on even date herewith by William H. Dunn and John W. Wurst, and assigned to the assignee of the present invention, now U.S. Pat. No. 4,177,744, the disclosure of which application is hereby incorporated nby reference. However, for the sake of completeness, a brief description of the system disclosed in the above referenced application will be given herein.

In a sewing machine of the type disclosed in the above referenced application, a pattern memory 101 is utilized for storing digital information related to the positional coordinates for each stitch of a plurality of stitch patterns. Under the control of an operator influenced central control system 103, the appropriate information from the pattern memory 101 is applied to a pulse width modulator 105, the output of which on the lead 106 is supplied to appropriate circuitry, as will be described in more detail hereinafter, which provides an analog signal to a summing junction 107 which is the input to a closed loop servo system for controlling the respective bight or feed actuator. The closed loop servo system includes an outer position loop and an inner rate loop. The position loop includes the preamplifier 108, the rate loop, and the position sensor 109. The rate loop includes a power amplifier 111 which supplies direct current of reversible polarity to an electromechanical actuator 113, which in the broadest sense comprises a reversible DC motor, to position the actuator 113 in accordance with the input signal to the summing junction 107, derived from the signal on the line 106 from the pulse width modulator 105. The feedback position sensor 109 is mechanically connected to the reversible motor 113 and provides a feedback position signal for the position loop, which signal is differentiated with respect to time in a differentiator 117 to provide a rate signal. This rate signal is presented on the line 119 to the summing junction 120 of the power amplifier 111 to modify the positional signal at that point. As disclosed in the aforereferenced application, a reduction memory 121 is provided so that when an operator desires to alter, or override, the information stored in the pattern memory 101 to achieve a desired stitch length or width, an appropriate digital word is applied to the leads 123 as an input to a pulse width modulator 125.

In accordance with the principles of this invention, the output of the pulse width modulator 105 on the lead 106 is presented as an input to an operational amplifier 127. The signal on the lead 106 is a high frequency digital signal having an ON/OFF duty cycle controlled by the binary number of the input to the pulse width modulator 105 from the pattern memory 101, in a manner well known in the art. For example, if the binary number presented as the input to the pulse width modulator 105 is 01100, equivalent to the decimal number 12, the duty cycle of the signal on the lead 106 will be 13/32. The circuitry stage including the operational amplifier 127 functions as a combined filter and digital to analog converter to provide an analog signal on the lead 129 which is a substantially DC level having a magnitude and polarity depending upon the duty cycle of the signal on the lead 106. The break point between the positive and negative outputs at the point 129 as a function of the duty cycle of the signal on the lead 106 is determined by the ratio of the resistors 131 and 133 which provide, in combination with reference voltage source 135, a reference voltage at the noninverting input terminal of the operational amplifier 127. The duty cycle controlled signal on the lead 106 is at a high frequency and is filtered by resistors 137 and 139 and capacitor 141 to provide a substantially DC voltage level, whose average magnitude is determined by the duty cycle of the signal on the lead 106 at the inverting input terminal of the operational amplifier 127. Thus, on the lead 129 there is an analog signal which is a function of a digitial code word presented to the pulse width modulator 105 from the pattern memory 101.

The analog signal on the lead 129 is coupled through a factory adjustable potentiometer 143 to the input of a preamplifier stage 145. The preamplifier stage 145 includes an operational amplifier 147, an input resistor 149 and a feedback resistor 151. As is well known in the art, the ratio of the output voltage of the preamplifier stage 145 on the lead 153 to the input voltage on the lead 155 is equal to the ratio of the value of the feedback resistor 151 to the value of the input resistor 149. In an illustrative embodiment constructed in accordance with the principles of this invention, the feedback resistor 151 and the input resistor 149 are choosen to be equal in value so that the nominal gain of the preamplifier stage 145 is 1 volt per volt. However, in accordance with the principles of this invention, an analog switch 157 is provided to shunt the feedback resistor 151. The control terminal of the switch 157 is connected via the lead 159 to the output of the pulse width modulator 125. When the switch 157 is pulsed ON, the feedback resistor 151 is short circuited, causing the gain of the preamplifier stage 145 to be substantially 0 volts per volt. When the switch 157 is OFF, as described above the gain of the preamplifier stage 145 will be 1 volt per volt. Therefore, if the switch 157 is pulsed ON and OFF at a high frequency, illustratively on the order of 6 kilohertz, the effective, or average, value of the feedback resistance as seen by the operational amplifier 147 will be determined by the ON/OFF duty cycle of the switch 157. For example, if the signal on the lead 159 were to have a duty cycle of 25% ON and 75% OFF the average value of the feedback resistance of the operational amplifier 147 would be 75% of the value of the resistor 151 and thus, the gain of the preamplifier stage 145 would be 0.75 volts per volt, a reduction from its nominal gain of 1 volt per volt. Thus, a digital code word in the reduction memory 121 may be utilized to reduce the gain of the preamplifier stage 145 and hence override information stored in the pattern memory 101.

It was previously mentioned that the switch 157 is an analog switch. The reason for having the switch 157 as an analog switch is that the input signal to the preamplifier stage 145 on the lead 155 is, as previously described, an analog signal. Furthermore, this signal may have either polarity and in such case the switch 157 must be capable of handling bipolar analog signals. Illustratively, the swtich 157 may be a type CD4016B COS/MOS bilateral switch, manufactured by RCA. Alternatively, a field effect transistor (FET) may be utilized.

The output of the preamplifier stage 145 on the lead 153 is coupled through a filtering stage 161 to the summing junction 107, where it is processed as described above. The purpose of the filtering stage 161 is to substantially eliminate the frequency effect of the controlled rate switching of the switch 157 so that a substantially DC signal is applied to the summing junction 107.

Accordingly, there has been disclosed in a system for positioning an instrumentality over a predetermined range in response to a digitally coded position signal, an arrangement for selectively reducing the movement of the instrumentality in response to a digitally coded override signal. Although the arrangement has been disclosed as being embodied in a sewing machine, it is understood that this is merely illustrative of the application of the principles of this invention. Numerous other arrangements may be devised by those skilled in the art without departing from the spirit and scope of this invention, as defined by the appended claims.

Having thus set forth the nature of the invention, what is claimed herein is:

1. In a system for positioning an instrumentality over a predetermined range in response to a digitally coded position signal including digital to analog converter means for generating a positional analog signal related to said digitally coded position signal and closed loop servo means including a reversible electric motor responsive to said positional analog signal for positioning said instrumentality, the improvement comprising means for selectively reducing the movement of said instrumentality including:
   an operational amplifier interposed between said digital to analog converter means and said closed loop servo means, said operational amplifier having a feedback circuit including a fixed resistor;
   controllable switch means including an analog switch connected across said resistor; and
   means for controlling said switch means to selectively short circuit said resistor at a controlled rate to effect a controlled gain reduction for said operational amplifier.

2. The system according to claim 1 wherein said analog switch comprises a COS/MOS bilateral switch.

3. The system according to claim 1 wherein said analog switch comprises a field effect transistor.

4. The system according to claim 1 further including filter means interposed between said operational amplifier and said closed loop servo means for filtering the output of said operational amplifier to substantially eliminate the frequency effect of the controlled rate switching of said switch means.

5. The system according to claim 1 wherein said means for controlling said switch means includes a pulse width modulator for supplying a duty cycle controlled signal to control said switch means.

6. In a sewing machine having stitch forming instrumentalities positionally controlled over a predetermined range between stitches to produce a pattern of feed and bight controlled stitches, static memory means for storing pattern stitch information in the form of digitally coded position words, means operating in timed relation with said sewing machine for recovering selected digitally coded position words from said static memory means, and separate actuating means responsive to said digitally coded position words for influencing the feed and bight motions respectively to produce a pattern of stitches corresponding to the selected digitally coded position words, each of said actuating means including digital to analog converter means for generating a positional analog signal related to a selected digitally coded position word and closed loop servo means including a reversible electric motor responsive to said positional analog signal for positioning said instrumentality, the improvement comprising means for selectively reducing the movement of said instrumentality including:

an operational amplifier interposed between said digital to analog converter means and said closed loop servo means, said operational amplifier having a feedback circuit including a fixed resistor;

controllable switch means including an analog switch connected accross said resistor; and means for controlling said switch means to selectively short circuit said resistor at a controlled rate to effect a controlled gain reduction for said operational amplifier.

* * * * *